(12) United States Patent
Kuykendall et al.

(10) Patent No.: US 6,656,566 B1
(45) Date of Patent: *Dec. 2, 2003

(54) RETROREFLECTIVE LUMINESCENT ARTICLES

(75) Inventors: C. Richard Kuykendall, Prior Lake, MN (US); David J. Murphy, Vadnais Heights, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,543

(22) Filed: Apr. 15, 1997

(51) Int. Cl.⁷ ................................................. B32B 3/24
(52) U.S. Cl. ...................... 428/138; 428/195; 428/201; 428/203; 428/204; 428/207; 428/143; 428/325; 428/913; 359/530; 359/531; 359/532; 359/533; 359/534; 359/536; 359/529; 40/611; 40/615
(58) Field of Search ............................. 428/138, 195, 428/201, 203, 204, 207, 143, 325, 913; 359/530, 531, 532, 533, 534, 536, 529; 40/611, 615

(56) References Cited

U.S. PATENT DOCUMENTS

| | | | |
|---|---|---|---|
| 3,830,682 A | 8/1974 | Rowland | 161/2 |
| 4,025,159 A | 5/1977 | McGrath | 350/105 |
| 4,588,258 A | 5/1986 | Hoopman | 350/103 |
| 4,767,659 A | 8/1988 | Bailey | 428/203 |
| 4,805,984 A | 2/1989 | Cobb, Jr. | 350/96.28 |
| 4,952,023 A | 8/1990 | Bradshaw | 350/102 |
| 5,095,415 A | 3/1992 | Anderson et al. | 362/329 |
| 5,101,755 A | 4/1992 | Barrett | 116/209 |
| 5,122,902 A | 6/1992 | Benson | 359/529 |
| 5,138,488 A | 8/1992 | Szczech | 359/529 |
| 5,141,790 A | 8/1992 | Calhoun et al. | 428/40 |
| 5,243,457 A | 9/1993 | Spencer | 119/795 |
| 5,296,277 A | 3/1994 | Wilson et al. | 428/40 |
| 5,300,783 A | 4/1994 | Spencer et al. | |
| 5,315,491 A | 5/1994 | Spencer et al. | 362/84 |
| 5,362,516 A | 11/1994 | Wilson et al. | 427/207.1 |
| 5,415,911 A | 5/1995 | Zampa et al. | 428/40 |
| 5,450,235 A | 9/1995 | Smith et al. | 359/529 |
| 5,759,671 A * | 6/1998 | Tanaka et al. | 428/138 |
| 6,061,940 A * | 5/2000 | Rice | 40/594 |

FOREIGN PATENT DOCUMENTS

EP    0 747 736 A1   12/1996   ............ G02B/5/12

OTHER PUBLICATIONS

Data Sheet—3M Scotchcal Luminous Film Series 5700 (3M, St. Paul, MN, Mar. 18, 1997).
Patent Abstracts of Japan 06155693; Title– Structure Of Coating Film.
GLO–FLEX® and ELECTRO–FLEX™ Advanced Safety Technology™ Products by American Ingenuity, Inc. Undated.

* cited by examiner

Primary Examiner—William P. Watkins, III
(74) Attorney, Agent, or Firm—Carolyn A. Fischer

(57) ABSTRACT

Sheeting material is disclosed that contains a retroreflective layer and a layer of luminescent material on the bottom or lower surface of the retroreflective layer. The sheeting material can be formed into signage or decorative articles that are highly visible under a variety of lighting conditions. A portion of the retroreflective layer is visible through the luminescent layer or through one or more openings in the luminescent layer which are in the form of slits, perforations, alphanumeric or other patterns. The luminescent layer can be imaged using analog or digital printing processes. The sheeting material can be made from materials that are suitable for back-lit illumination. Adhesives or other conventional attachment means can be employed to anchor the signs in interior or exterior environments.

36 Claims, No Drawings

RETROREFLECTIVE LUMINESCENT ARTICLES

TECHNICAL FIELD

The invention provides sheeting articles having a retroreflective layer with upper and lower surfaces and a luminescent layer disposed upon the upper surface of the retroreflective layer. The invention also provides articles such as signs made from the sheeting.

BACKGROUND OF THE INVENTION

Retroreflective materials are generally known for use in applications where high visibility is a necessity, for example in traffic signs and other safety applications. The retroreflectivity of these materials provides for high visibility at night when illuminated by a headlight, flashlight or other light source from the same side of the material as the the viewer of the material, i.e., a "front-lit" surface One type of retroreflective material comprises microspheres of a material such as glass that have a specular reflecting layer coated on one surface to reflect the incident light. An example of this type of retroreflective material is available under the trademark SCOTCHLITE from Minnesota Mining and Manufacturing Company, St. Paul, Minn.

Another type of retroreflective material is made up of cube corner elements. This type of retroreflective material is described in, for example, U.S. Pat. No. 4,588,258 to Hoopman et al. The cube corner elements may be separated, producing flat areas that will transmit light from behind the retroreflective layer. This technique is described in Benson, U.S. Pat. No. 5,122,902.

Luminescent dyes and pigments are also known in the preparation of signs and other articles where visibility in dark conditions is required. Chemiluminescent and/or photoluminescent materials may be used. The luminous material may be attached to exits, stairways, fire extinguishers, and so on to guide a person in the event of a power failure. While this is effective immediately after loss of power occurs, the luminescence of such materials decreases rapidly and may be substantially gone in a relatively short time.

These photoluminescent films are known and are commercially used to provide signage that warns, cautions, and provides other messages conveying safety information. Frequently, these films are combined with an adhesive to form a photoluminescent tape. Sometimes also characterized as "Glow-in-the-Dark", "luminous", or "luminescent", these films or tapes are based on materials that absorb photons and emit visible light.

Photoluminescent films and tapes can be found in commercial catalogs such as the *Seton Identification Products Catalog* (Seton Products, Branford Conn., page AE33, 1996); *D&G Sign and Label Catalog WK* (D&G Sign and Label, Northford, Conn., page W37, (Summer 1996); and *Brady-Signmark Division Catalog S-17* (W. H. Brady Co., Milwaukee, Wis., p. 46, 1996). Typical messages include "Danger—High Voltage"; "Exit"; "Fire Alarm"; "Fire Extinguisher"; "Oxygen No Smoking"; and the like. Some of the messages include graphics and multiple colors such as the "Danger—High Voltage" sign with the "Danger" printed in photoluminescent white in a red oval within a black rectangle above "High Voltage" printed in black within a photoluminescent white rectangle. The messages are prepared using silk-screening or other analog printing techniques.

Thus, it would be desirable to provide a signage article that combines the properties of retroreflectivity and luminescence. An article having such properties would be highly visible when there is a light source available to impinge upon its surface in a "front-lit" condition and would also be visible in conditions of complete or near-complete darkness.

Attempts have been made to combine retroreflectivity and luminescence in a signage article. In U.S. Pat. No. 5,243,457 Spencer describes a sheeting material that has a layer of luminescent material behind a layer of retroreflective material. The retroreflective layer used in this sheeting is not transparent or translucent and is said to protect the luminescent layer from decay. In U.S. Pat. No. 5,315,491 Spencer et al. provide a sign made from such a material with backlighting. Zampa, U.S. Pat. No. 5,415,911 provides a multilayered sheeting material that has a retroreflective layer and a phosphorescent pigment in at least one of the layers beneath the retroreflective layer.

In certain situations it may be desirable for a sign to be internally illuminated from the side opposite of the side seen by the viewer so that it may be viewed in the absence of retroreflective lighting conditions, i.e., a "back-lit" surface. Bradshaw et al., U.S. Pat. No. 4,952,023 describes a sign that is retroreflective and is internally illuminated.

All of the known prior art materials that combine retroreflective and luminescent materials provide the luminescent layer behind or on the reverse face of the retroreflective layer. Such materials are relatively expensive to manufacture and are susceptible to peeling damage because signs that are produced from such materials often have lettering cut from the retroreflective material and adhesively applied to the luminescent layer. For example, the mere peeling of one letter can tremendously change the message conveyed by a sign in a retroreflective environment. "STOP" has a very different message if it becomes "TOP".

SUMMARY OF THE INVENTION

Thus, there is a need in the art for a material that effectively and efficiently combines the properties of retroreflectivity and luminescence. Moreover, there is a need in the art of signage to combine the best properties in "front-lit" and "back-lit" signage which employs both retroreflective materials and luminescent materials.

Accordingly, one aspect of the invention provides an article, preferably a sheeting material, having retroreflective and luminescent properties, with a retroreflective layer having an upper surface and a lower surface and a luminescent layer disposed upon the upper surface of the retroreflective layer. This material can be used to prepare signs, labels, and other articles where high visibility under a variety of conditions is required, and such articles are also provided by the invention.

Preferably, at least a portion of the retroreflective layer is exposed through one or more openings in the luminescent layer.

Also preferably, the luminescent layer or the retroreflective layer or both can be made of a material that permits back-lit illumination of the article. Such signs are visible under conditions of external or front-lit illumination and are also visible when there is no external light source, either by virtue of the internal light source or other back-lit source or by virtue of the luminescence itself of the luminescent layer.

Also preferably, the luminescent layer can be imaged by an analog or digital printing process. In this manner, any possible combination of cut and digitally printed image graphics can be created for education, entertainment, information, and the like.

Either or both of the layers can be flexible to withstand bending caused by assembly, usage, or environmental conditions such as high winds.

Any of the preferable options can be combined into various embodiments of the invention, which are discussed in more detail below.

The articles of the invention combine the beneficial properties of retroreflective and luminescent materials, providing visibility both when light is available and in conditions or near or total darkness. These properties are enhanced when at least one of the retroreflective or luminescent layers is translucent, such that some light can pass through the layer.

The term "luminescent" is used interchangeably with "photoluminescent" and describes materials that absorb photons and emit visible light.

Further features and advantages of the invention will be discussed with respect to the following embodiments.

DETAILED DESCRIPTION OF PREFERRED EMBODIMENTS

The material of the invention is a multiple layer construction that contains a retroreflective layer having upper and lower surfaces and a luminescent layer disposed upon the upper surface of the retroreflective layer.

There can be one or more openings in the luminescent layer, or the luminescent layer can be translucent so that a portion of the retroreflective layer is visible through the luminescent layer. The sheeting can be used in a number of different end products, such as signs and decorative articles.

Retroreflective Layer

The retroreflective layer can be any known retroreflective material, including cube-corner and glass bead type retroreflective sheetings. Such retroreflective materials are known and are described in detail in Smith, U.S. Pat. No. 5,450,235; Hoopman, U.S. Pat. No. 4,588,258; Szcech, U.S. Pat. No. 5,138,488; Benson, U.S. Pat. No. 5,122,902; Bailey, U.S. Pat. No. 4,767,659; and McGrath, U.S. Pat. No. 4,025,159, all of which are incorporated herein by reference.

The retroreflective layer can be translucent, if desired. Translucent retroreflective materials can be prepared in a number of different ways. For example, if the retroreflective material is of the microsphere type, a reflective backing is typically applied to the spheres to provide the desired reflectivity. If the backing is present on only a selected proportion of the spheres, light will pass through those spheres that do not have the backing and will provide the desired translucence to the retroreflective material. If the retroreflective material is of the cube-corner type, then translucency can be achieved, for example, by separation of the cube corner elements as described in U.S. Pat. No. 5,122,902, to Benson. This separation produces flat areas between the cube corners which can transmit light and provide translucence. A preferred retroreflective material is the translucent cube corner type.

If desired, the retroreflective layer can incorporate one or more colorants to provide the desired color and/or to improve the visibility of the layer. These colorants can be any of the types known to be useful in such sheeting applications, and can be fluorescent if desired.

Luminescent Layer

The luminescent layer can be prepared using any of the known photoluminescent materials known in the art. This layer may itself be a multi-layered construction consisting of a luminescent layer and a carrier layer. The carrier layer, generally a thermoplastic material such as vinyl, is covered with a barrier layer to prevent migration of the luminescent material into the carrier layer. This barrier layer can be made of any suitable material, such as acrylic or methacrylic type resins. The luminescent layer, which may be a vinyl or other suitable thermoplastic having photoluminescent particles dispersed therein, is then adhesively disposed upon the barrier layer. Any of the known photoluminescent materials can be incorporated into this layer. Translucency can be achieved for this layer by variation of the thickness of the layer and/or the distribution of the photoluminescent particles. Use of an adhesive that is non-pigmented can improve the translucence of this layer. Visibility of the retroreflective layer can also be improved by cutting slits into or perforating the luminescent layer. Photoluminescent film is commercially available from Minnesota Mining and Manufacturing Company (3M) as 3M™ Scotchcal™ Luminous Film Series 5700 that provides a luminosity that lasts up to six hours after photon excitation in the film ends.

If desired, the luminescent layer can be a luminescent ink that is printed, e.g. screen printed, or coated onto the retroreflective layer. The composition and thickness of the layer can be varied to provide the desired degree of translucency and/or luminescence. If such an ink is used the layer can be a continuous translucent layer, or can create various patterns and/or alphanumeric symbols either in solid or outline form.

The photoluminescent layer and the retroreflective layer combine to form the sheeting material of the invention. Unlike sheeting materials of the prior art, the inventive material places the photoluminescent layer on top of the retroreflective layer, providing a material that is easily produced and that can be used in a variety of signage and decorative applications. The layers may be attached to one another using an adhesive, they may be held in place using clamps, clips or other suitable mechanical means, or they may be placed together in a frame or bracket that holds the layers together. If an adhesive is not used to hold the layers in place, then the material has the additional advantage of allowing for layers to be added or interchanged as desired or necessary.

Image Preparation

When the sheeting material of the invention is used to prepare articles such as signs and decorative articles, the desired pattern, indicia, or other image can be present in a number of different ways from the basic principle of the invention that the luminescent layer be closer to the viewer than the retroreflective layer.

Depending on the thickness of the luminescent layer, one can position lettering, symbols, or other cut out pieces of retroreflective layer adhesively on to the major surface of the luminescent layer opposite the viewer of the article. These pieces can be prepared and assembled using any of the commercially available sign graphics production equipment, such as sold by Gerber Scientific Company of Manchester, Conn. using Scotchliter™ brand material discussed above. This embodiment can be quite versatile and particularly effective if the luminescent layer is slit or perforated in a manner disclosed in U.S. Pat. No. B1 4,673,609 (Hill).

In a second embodiment, the desired outline for the retroreflective image can be cut directly from the luminescent layer, allowing the retroreflective material to be seen through the cut-out portions. This method is generally preferred, as it displays the pattern or message both retroreflectively in a front-lit condition and through luminescence with no applied illumination. Gerber brand equipment can be used to fashion intricate cut out locations on the luminescent layer.

In a third embodiment, a pattern can also be printed upon one or both of the retroreflective and luminescent layers. This pattern may be on or beneath the portions of the luminescent layer that are not cut out, thereby allowing different messages to be displayed with different lighting conditions. The method of printing can be analog or digital. In analog printing, such as screen-printing or using Gerber brand cutting equipment, the actual display of the image is preconceived mechanically and delivered to a surface of one of the two layers. In digital printing, a computer and printer are used to generate a pattern of dots or other minute elements that, in turn, from a viewing distance becomes an image of nearly photographic quality.

Digital Imaging: Electrostatic Hardware and Software

Electrostatic transfer for digital imaging employs a computer to generate an electronic digital image, an electrostatic printer to convert the electronic digital image to a multicolor toned image on a transfer medium, and a laminator to transfer the toned image to a durable substrate.

Nonlimiting examples of electrostatic printing systems include the Scotchprint™ Electronic Graphics System from 3M. This system employs the use of personal computers and electronically stored and manipulated images. Nonlimiting examples of electrostatic printers are single-pass printers (Models 9510 and 9512 from Nippon Steel Corporation of Tokyo, Japan and the Scotchprint™ 2000 Electrostatic Printer from 3M) and multiple-pass printers (Model 8900 Series printers from Xerox Corporation of Rochester N.Y., USA and Model 5400 Series from Raster Graphics of San Jose, Calif., USA)

Nonlimiting examples of electrostatic toners include Model 8700 Series toners from 3M. Nonlimiting examples of transfer media include Model 8600 media (e.g., 8601, 8603, and 8605) from 3M.

Nonlimiting examples of laminators for transfer of the digital electrostatic image include Orca III laminator from GBC Protec, DeForest, Wis.

With transfer of the digital electrostatic image from the transfer medium to a photoluminescent film or tape, optionally but preferably, a protective layer is applied to the resulting imaged photoluminescent film or tape. Nonlimiting examples of protective layers include liquid-applied "clears" or overlaminate films. Nonlimiting examples of protective clears include the Model 8900 Series Scotchcal™ Protective Overlaminate materials from 3M. Nonlimiting examples of protective overlaminates include those materials disclosed in copending, coassigned, U.S. patent application Ser. No. 08/613,741 (Bull et al.) and copending, coassigned, PCT Pat. Appln. Serial No. US96/07079 (Bull et al.) designating the USA and those materials marketed by 3M as Scotchprint™ 8626 and 3645 Overlaminate Films.

Digital Imaging: Ink Jet Hardware and Software

Thermal ink jet hardware is commercially available from a number of multinational companies, including without limitation, Hewlett-Packard Corporation of Palo Alto, Calif., USA; Encad Corporation of San Diego, Calif., USA; Xerox Corporation of Rochester, N.Y., USA; LaserMaster Corporation of Eden Prairie, Minn. USA; and Mimaki Engineering Co., Ltd. of Tokyo, Japan. The number and variety of printers changes rapidly as printer makers are constantly improving their products for consumers. Printers are made both in desk-top size and wide format size depending on the size of the finished graphic desired. Nonlimiting examples of popular commercial scale thermal ink jet printers are Encads—NovaJet Pro printers and H-P's 650C and 750C printers. Nonlimiting examples of popular desk-top thermal ink jet printers include H-P's DeskJet printers.

3M markets Graphic Maker Ink Jet software useful in converting digital images from the Internet, ClipArt, or Digital Camera sources into signals to thermal ink jet printers to print such images.

Ink jet inks are also commercially available from a number of multinational companies, particularly 3M which markets its Series 8551; 8552; 8553; and 8554 pigmented ink jet inks. The use of four principal colors: cyan, magenta, yellow, and black permit the formation of as many as 256 colors or more in the digital image.

Illumination

The sheeting material of the invention is useful to prepare signage and other articles that are highly visible under a variety of lighting conditions. The articles are highly visible in the presence of light that comes from a front-lit source such as a flashlight or emergency backup lights due to their retroreflective properties. They are also visible under conditions of darkness due to their photoluminescent properties, and are readily visible under normal lighting conditions.

To further enhance visibility, a sign that incorporates the sheeting material can optionally include a back-lit light source. Such a light source allows the sign to be seen even if there is no external front-lit light source and may prolong the luminescent visibility of the sign. The light may be constant; it may be intermittent or flashing; or it may be programmed to operate at certain times, for example at night. It may be battery operated, to work in the event of a power failure.

The back-lit light source can be a direct, internal light source located inside the sign, such as incandescent or fluorescent light bulbs, or it can be an external light source that is brought to the interior of the sign by a light conduit. Use of a light conduit provides the advantage of an external light source, allowing bulbs to be changed or repairs to be made without the necessity of disassembling the sign. Suitable light conduits include those that are totally internally reflecting and are described in greater detail in U.S. Pat. No. 4,805,984 to Cobb, Jr. and U.S. Pat. No. 5,095,415 to Anderson et al., both of which are incorporated herein by reference.

Adhesion and Protection of the Sheeting Material

If desired, a layer of adhesive can be included in the sheeting material. This layer will generally be found on the bottom of the retroreflective layer (continuous or portions depending on the embodiment involved) and allows the sheeting material or articles made from the sheeting material to be securely attached to a wall, panel, table, floor or other substrate. The type of adhesive is selected according to the intended use of the sheeting material or article, the nature of the substrate, and other factors known to those of skill in the art. For example, a pressure sensitive adhesive may be desired for some applications, and in addition to the pressure sensitive properties the ability to slide or reposition the article before the adhesive sets or cures may also be advantageous. Commercially superior pressure sensitive adhesives for sign graphics are available on image graphic webs marketed under the Scotchcal™ and Scotchcal™ Plus brands from 3M of St. Paul, Minn., USA. Pressure sensitive adhesives having this utility are disclosed in a variety of patents. Representative examples of patents describing such materials include U.S. Pat. Nos. 5,296,277 and 5,362,516 (both Wilson et al.) and U.S. Pat. No. 5,141,790 (Calhoun et al.). A release liner may also be applied to protect the adhesive layer until needed. Larger or heavier articles may be attached using brackets, screws, nails, hooks, or other means.

If desired the sheeting material or article can incorporate a protective top sheet. Such a layer helps protect the underlying layers from impact, abrasion and soil. The top layer can be made from any suitable film material that has the desired durability and permits the underlying layers to be seen. Examples of useful materials for forming the top sheet include acrylic polymers such as polymethyl methacrylate, fluoropolymers, urethanes, and the like. If desired, additional components may be incorporated into the top sheet, such as fluorescent materials, UV light absorbers, antioxidants, colorants, etc.

It is also possible to include further retroreflective elements on the exposed major surface of the luminescent layer, out of registration of with those portions of the retroreflective layer either concealed beneath the luminescent layer or revealed through cut-out portions of the luminescent layer.

The above specification provides a complete description of the invention. All of the above mentioned U.S. patents are incorporated herein by reference. Because many embodiments of the invention are possible without departing from the spirit and scope of the invention, the invention resides in the claims hereinafter appended.

What is claimed is:

1. A sheeting material having retroreflective and luminescent properties consisting of:
   (a) a retroreflective layer consisting of retroreflective sheeting having upper and lower surfaces;
   (b) a luminescent layer consisting of a photoluminescent film disposed upon the upper surface of the retroreflective layer, wherein the luminescent layer comprises one or more openings, each of the openings being in the shape of a letter or symbol;
   (c) an optional pattern printed on at least one of the retroreflective layer and the luminescent layer; and
   (d) an optional layer of adhesive disposed on the lower surface of the retroreflective layer.

2. The material of claim 1, wherein the luminescent layer can be imaged by an analog or digital printing process.

3. The material of claim 2, where the digital printing is an electrostatic printing process or an inkjet printing process.

4. The material of claim 1, which is flexible.

5. A sign comprising the sheeting material of claim 1.

6. A tape or label comprising the material of claim 1.

7. A sign having retroreflective and luminescent properties comprising:
   a) a retroreflective layer consisting of retroreflective sheeting having upper and lower surfaces;
   b) a luminescent layer consisting of a photoluminescent film disposed upon the upper surface of the retroreflective layer, wherein the luminescent layer comprises one or more openings, each of the openings being in the shape of a letter or symbol and at least a portion of the retroreflective layer is exposed though the one or more openings; and
   c) a light source.

8. The sign of claim 7, wherein the retroreflective layer is located between the light source and the luminescent layer.

9. The sign of claim 7, further comprising a pattern printed on at least one of the retroreflective layer and the luminescent layer.

10. The sign of claim 9, wherein the pattern is located between the retroreflective layer and the luminescent layer.

11. The sign of claim 7, further comprising a pattern printed on a side of the luminescent layer opposite the retroreflective layer.

12. The sign of claim 7, wherein the retroreflective layer comprises a plurality of pieces of retroreflective material.

13. The material of claim 1, wherein the pattern is located between the retroreflective layer and the luminescent layer.

14. The material of claim 1, wherein the pattern is printed on a side of the luminescent layer opposite the retroreflective layer.

15. The material of claim 1, wherein the retroreflective layer comprises a plurality of pieces of retroreflective material.

16. Sheeting material having retroreflective and luminescent properties comprising:
    a retroreflective layer consisting of retroreflective sheeting having upper and lower surfaces; and
    a luminescent layer consisting of photoluminescent film disposed upon the upper surface of the retroreflective layer, and at least one retroreflective image, wherein an outline of the retroreflective image is cut-out from the luminescent layer allowing the retroreflective material to be seen though the cut-out portion.

17. The material of claim 16, wherein the retroreflective layer is translucent.

18. The material of claim 16, wherein the luminescent layer is translucent.

19. The material of claim 16, further comprising a pattern printed on at least one of the retroreflective layer and the luminescent layer.

20. The material of claim 16, further comprising a pattern printed on at least one of the retroreflective layer and the luminescent layer, wherein the pattern is located between the retroreflective layer and the luminescent layer.

21. The material of claim 16, further comprising a pattern printed on a side of the luminescent layer opposite the retroreflective layer.

22. The material of claim 16, wherein the retroreflective layer comprises a plurality of pieces of retroreflective material.

23. The material of claim 1, wherein the retroreflective layer and the luminescent layer are translucent.

24. The material of claim 1, wherein the retroreflective layer is translucent.

25. The material of claim 1, wherein the luminescent layer is translucent.

26. The material of claim 7, wherein the luminescent layer is made of a material that permits back-illumination of the material.

27. The material of claim 7, wherein the retroreflective layer is made of a material that permits back-lit illumination.

28. The material of claim 7, wherein the retroreflective layer is translucent.

29. The material of claim 7, wherein the luminescent layer is translucent.

30. The sign of claim 7, wherein at least a portion of the retroreflective layer is exposed through the one or more openings in the luminescent layer.

31. The material of claim 16, wherein the retroreflective image comprises a letter or symbol.

32. The material of claim 16, wherein the retroreflective layer and the luminescent layer are translucent.

33. The material of claim 1, wherein the letter or symbol is cut directly from the luminescent layer allowing the retroreflective layer to be seen through the cut-out portion.

34. The material of claim 7, wherein the letter or symbol is cut directly from the luminescent layer allowing the retroreflective layer to be seen through the cut-out portion.

35. The material of claim 1, wherein the material is visible under conditions of darkness when there is no external light source by virtue of the luminescene of the luminescent layer.

36. The material of claim 16, wherein the material is visible under conditions of darkness when there is no external light source by virtue of the luminescene of the luminescent layer.

* * * * *

UNITED STATES PATENT AND TRADEMARK OFFICE
CERTIFICATE OF CORRECTION

PATENT NO. : 6,656,566 B1  Page 1 of 1
DATED : December 2, 2003
INVENTOR(S) : Kuykendall, C. Richard It is certified that error appears in the above-identified patent and that said Letters Patent is hereby corrected as shown below:

Column 1,
Line 19, delete "the" following "the".

Column 3,
Line 10, "or" should be -- of --.

Column 4,
Line 55, "Scotchliter™" should be -- Scotchlite™ --.

Column 7,
Line 12, delete "of" following "registration".
Line 49, "though" should be -- through --.

Column 8,
Line 14, "though" should be -- through --.
Line 62, "luminescene" should be -- luminescence --.
Line 64, "luminescene" should be -- luminescence --.

Signed and Sealed this

Sixteenth Day of March, 2004

JON W. DUDAS
*Acting Director of the United States Patent and Trademark Office*